US011753972B2

(12) United States Patent
Hanna

(10) Patent No.: US 11,753,972 B2
(45) Date of Patent: Sep. 12, 2023

(54) SYSTEM AND METHOD FOR ANNUNCIATING ENGINE LUBRICATING FLUID LEVEL

(71) Applicant: PRATT & WHITNEY CANADA CORP., Longueuil (CA)

(72) Inventor: Michael Hanna, Beaconsfield (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 294 days.

(21) Appl. No.: 17/151,362

(22) Filed: Jan. 18, 2021

(65) Prior Publication Data

US 2022/0228518 A1 Jul. 21, 2022

(51) Int. Cl.
*F01M 11/12* (2006.01)
*B64D 43/00* (2006.01)
*B64D 45/00* (2006.01)
*B64D 47/02* (2006.01)

(52) U.S. Cl.
CPC .......... *F01M 11/12* (2013.01); *B64D 43/00* (2013.01); *B64D 45/00* (2013.01); *B64D 47/02* (2013.01)

(58) Field of Classification Search
CPC ........ F01M 11/12; B64D 43/00; B64D 45/00; B64D 47/02; F02C 7/06; F05D 2220/323
See application file for complete search history.

(56) References Cited

U.S. PATENT DOCUMENTS

| | | | |
|---|---|---|---|
| 6,324,899 B1 | 12/2001 | Discenzo | |
| 7,486,179 B2* | 2/2009 | McCormick | G01F 23/76 340/623 |
| 2013/0261881 A1* | 10/2013 | Scheid | G06F 7/00 701/33.4 |
| 2014/0010639 A1 | 1/2014 | Snape et al. | |
| 2014/0203630 A1 | 7/2014 | Gmirya | |
| 2021/0156726 A1* | 5/2021 | Gebhard | G01F 23/2921 |
| 2021/0409045 A1* | 12/2021 | González Rodríguez | H04W 76/15 |

OTHER PUBLICATIONS

European Patent Office, Communication re. extended European search report for European patent application No. 22151865.7, dated May 24, 2022.

* cited by examiner

*Primary Examiner* — Syed O Hasan
(74) *Attorney, Agent, or Firm* — Norton Rose Fulbright Canada LLP

(57) ABSTRACT

There are described systems and methods for annunciating engine lubricating fluid level. The system comprises a first fluid level sensor for a first engine; a first low-level detector coupled to the first fluid level sensor; a first low-level indicator coupled to the first low-level detector for annunciating a fluid level of the first engine below a minimum operating level; and an annunciation and display system coupled to the first low-level detector and configured for performing non-critical lubricant-related functions. The first fluid level sensor, the first low-level detector, and the first low-level indicator are composed of first components having a critical level of reliability, the annunciation and display system is composed of second components having a non-critical level of reliability.

18 Claims, 5 Drawing Sheets

SYSTEM AND METHOD FOR ANNUNCIATING ENGINE LUBRICATING FLUID LEVEL

TECHNICAL FIELD

The application relates generally to the annunciation of the level of engine lubricating fluid.

BACKGROUND OF THE ART

The current practice in the aerospace industry with regards to engine oil verification is to manually check the level of lubricating fluid in the tank using a dipstick prior to every flight. The manual check is a time consuming task for the maintenance team, especially when then engines are not easily accessible.

While some automated engine lubricating fluid verification systems are suitable for their purposes, improvements are needed in the aerospace industry.

SUMMARY

In one aspect, there is provided an engine lubricating fluid level annunciating system. The system comprises a first fluid level sensor for a first engine; a first low-level detector coupled to the first fluid level sensor; a first low-level indicator coupled to the first low-level detector for annunciating a fluid level of the first engine below a minimum operating level; and an annunciation and display system coupled to the first low-level detector and configured for performing non-critical lubricant-related functions. The first fluid level sensor, the first low-level detector, and the first low-level indicator are composed of first components having a critical level of reliability, the annunciation and display system is composed of second components having a non-critical level of reliability.

In another aspect, there is provided a method for annunciating a level of lubricating fluid of at least one engine. The method comprises segregating critical and non-critical lubricant-related functions, the critical lubricant-related functions comprising measuring, detecting and annunciating a lubricant level of the at least one engine below a minimum operating level; performing the critical lubricant-related functions with first components having a critical level of reliability; and performing the non-critical lubricant-related functions with second components having a non-critical level of reliability.

In a further aspect, there is provided a method for annunciating a level of lubricating fluid of at least one aircraft engine. The method comprises sensing a fluid level with a fluid level sensor; detecting the fluid level below a minimum operating level at a low-level detector; annunciating the fluid level below the minimum operating level through a low-level indicator; and performing non-critical lubricant-related functions using annunciation and display system coupled to the low-level detector. The fluid level sensor, low-level detector, and low-level indicator are composed of first components having a critical level of reliability, the annunciation and display system is composed of second components having a non-critical level of reliability Any of the features described herein may be used together, in any combination.

DESCRIPTION OF THE DRAWINGS

Reference is now made to the accompanying figures in which.

DETAILED DESCRIPTION

Figure 1:
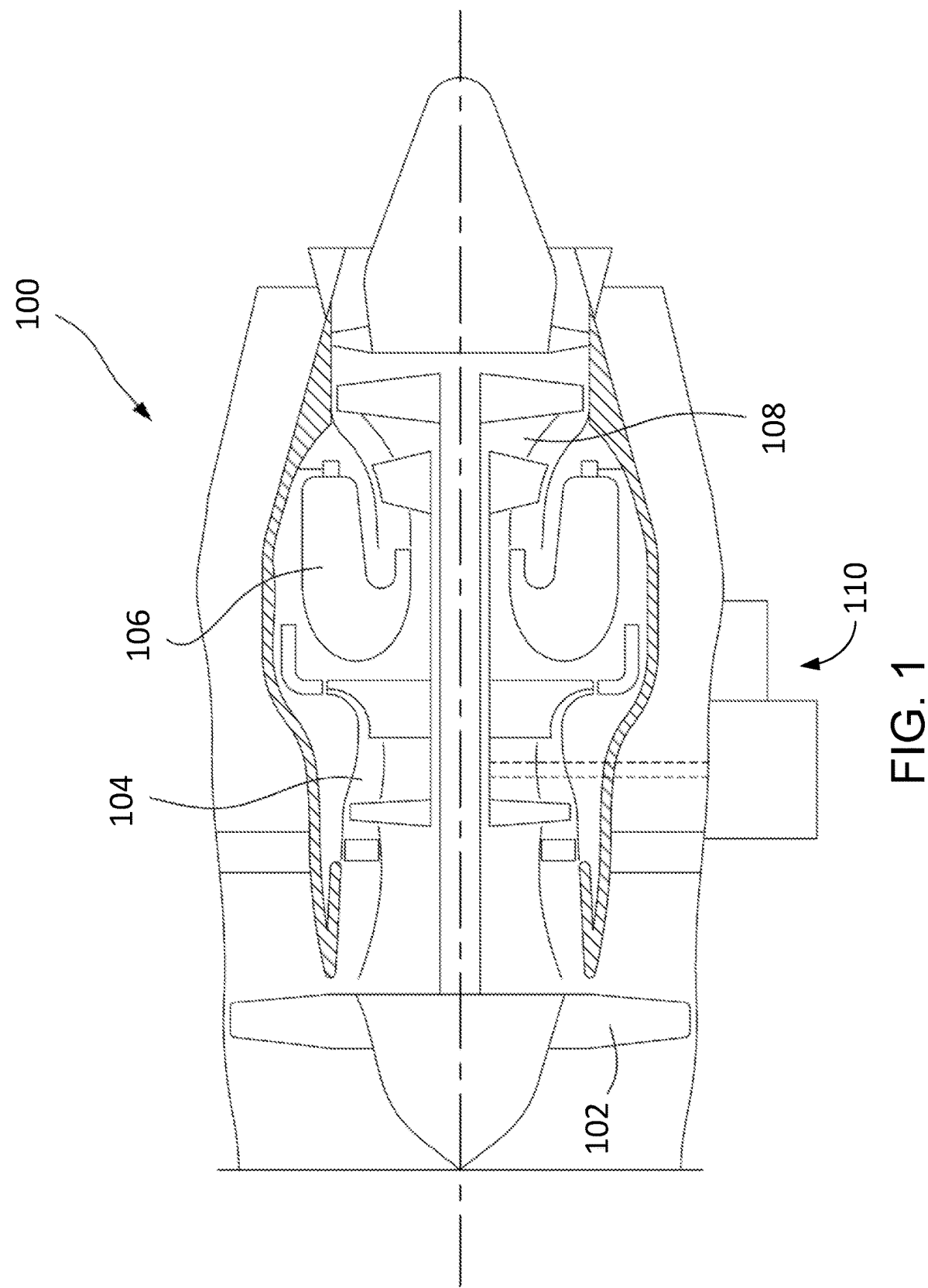
FIG. 1 is a schematic cross sectional view of a gas turbine engine.

The present disclosure is directed to methods and systems for annunciating the lubricating fluid level of an engine, such as a gas turbine engine. FIG. 1 illustrates a gas turbine engine 100 of a type provided for use in subsonic flight, generally comprising in serial flow communication a fan 102 through which ambient air is propelled, a compressor section 104 for pressurizing the air, a combustor 106 in which the compressed air is mixed with fuel and ignited for generating an annular stream of hot combustion gases, and a turbine section 108 for extracting energy from the combustion gases. Although illustrated as a turbofan engine, the gas turbine engine 100 may alternatively be another type of engine, for example a turboshaft engine, also generally comprising in serial flow communication a compressor section, a combustor, and a turbine section, and a fan through which ambient air is propelled. A turboprop engine may also apply.

An engine lubricating system 110 is coupled to the engine 100 for providing lubricating fluid thereto. The lubricating fluid provides a fluid barrier between moving parts of the engine 100, to prevent friction and wear. The lubricating fluid also contributes to the cooling of the engine 100 and provides sealing and cleaning functions as well. In some embodiments, the lubricating fluid is oil, such as single grade or multi-grade oil. Other lubricating fluids, such as synthetic compositions, may also be used. The lubricating system 110 may comprise a fluid pan/sump/tank, one or more pumps, one or more filters, and any other accessory or component used in circulating the lubricating fluid into and out of the engine 100.

Figure 2A:
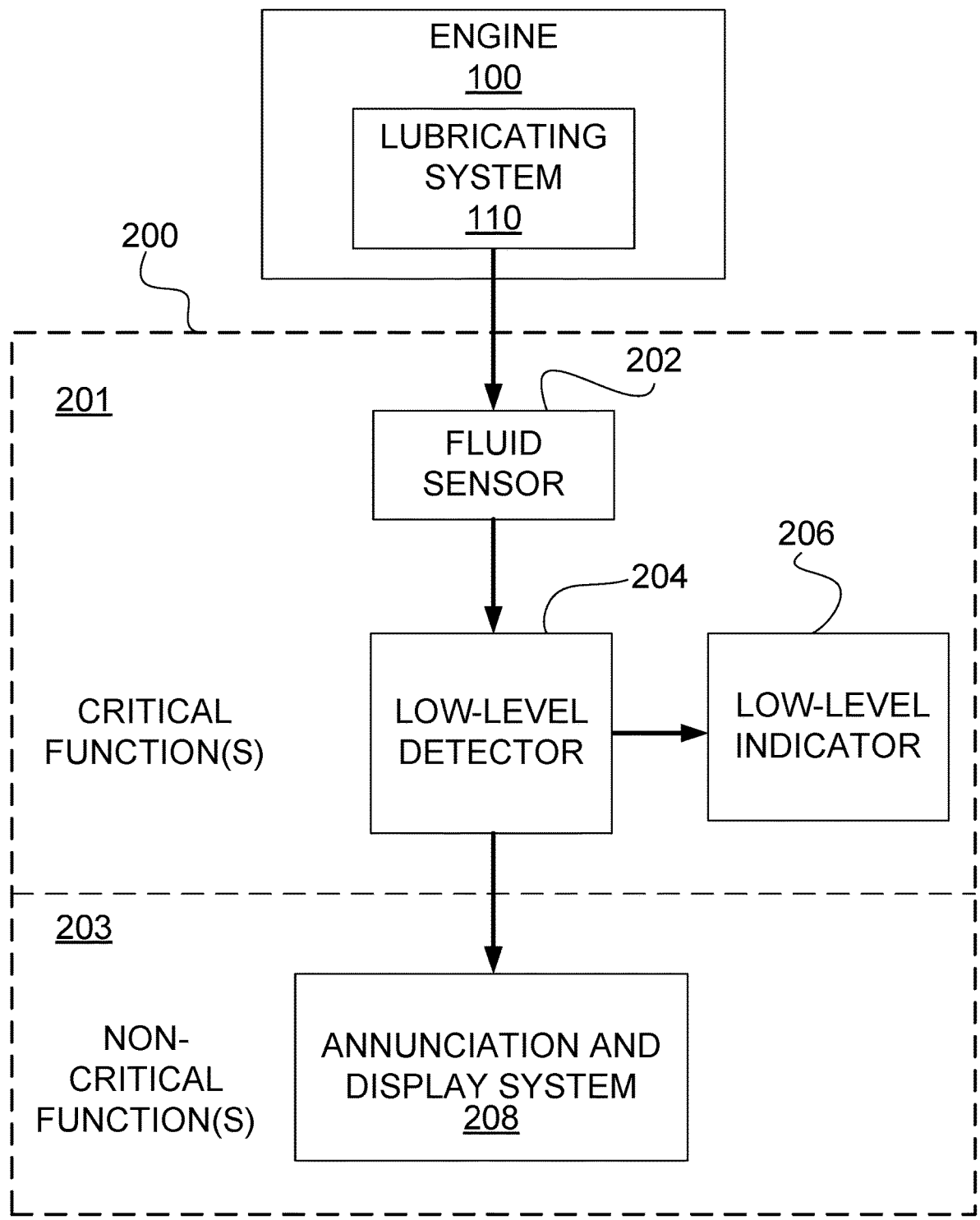
FIG. 2A is a block diagram of an example lubricating fluid level annunciating system for an engine.

Referring to FIG. 2A, there is illustrated an example embodiment of a system 200 for annunciating the level of lubricating fluid of an engine, such as engine 100. The current practice in the aerospace industry is to manually check the fluid level in the tank using a dipstick prior to every flight. While there exists automated systems for annunciating a lubricating fluid level, any such system used in the aerospace industry must comply with applicable safety requirements. This also applies for applications other than aerospace where a failure of the system could lead to catastrophic results. For an aircraft, engine lubricating fluid level falling below a minimum operating level may present a severe failure case as it can lead to engine power loss or damage. For certain types of aircraft, a potential engine power loss warrants a highest reliability level for related functions. The complexity of software-based systems, particularly those forming part of an aircraft fault annunciation system, make it difficult for such systems to have the highest reliability level. The system 200, as illustrated in FIG. 2A, allows the low lubricating fluid level to be annunciated automatically while respecting industry standards and guidelines for airborne electronic hardware.

For example, the current industry standard for the development of aircraft systems taking into account the overall aircraft operating environment and functions may be found in ARP4754A. This document describes the design assurance concept for application at the aircraft and system level and standardizes the term "development assurance". Another document, RTCA DO-254 provides guidance for the development of airborne electronic hardware and has been recognized by the Federal Aviation Administration (FAA) as a means of compliance for the development assurance of electronic hardware in airborne systems. There are five levels of compliance, A through E, which depend on the effect a failure of the hardware will have on the operation of the aircraft. Development Assurance Level (DAL) A is the most stringent, defined as a "catastrophic" effect, while a DAL E will not affect the safety of the aircraft. Meeting DAL A compliance for complex electronic hardware requires a much higher level of verification and validation than a DAL E compliance. Most avionic platforms are DAL B or DAL C and therefore cannot be used to annunciate a level of lubricating fluid lower than a minimum operating level, as this function must meet DAL A.

The system 200 for annunciating the level of lubricating fluid of an engine is provided with an architecture that has its critical and non-critical lubricant-related functions segregated, so as to meet industry regulations such as RTCA DO-254. It will be understood that the applicability of the system 200 goes beyond the guidelines defined by RTCA DO-254 and may be generalized to any requirements associated with the reliability level of the components performing a given function. Critical lubricant-related functions are performed by components having a critical, or highest, level of reliability and non-critical lubricant-related functions are performed by components having a non-critical level of reliability. For the purposes of the present disclosure, a component is deemed to have a critical level of reliability if a comprehensive combination of deterministic tests and analyses can ensure correct functional performance under all foreseeable operating conditions with no anomalous behavior. Conversely, a component that cannot have a correct functional performance ensured by tests and analyses alone cannot be assigned a critical level of reliability and is therefore deemed to have a non-critical level of reliability. There may be multiple levels of non-criticality.

The critical functions are provided in a first section 201 and the non-critical functions are provided in a second section 203. The critical lubricant-related functions comprise determining that the lubricant is below a minimum operating level and annunciating this information, and are performed with components having a critical level of reliability, which is equivalent to DAL A for RTCA DO-254. The expression "annunciate" is used herein to refer to an announcement of the low fluid level, such as through a flashing light, an audio alarm, a text message, or any other type of display of information capable of being produced with components having a critical level of reliability. Non-critical related functions, such as but not limited to maintenance planning, health diagnostics, and other data tracking features, are performed with components having a non-critical level of reliability, and for example may be DAL B or DAL C in accordance with RTCA DO-254.

In some embodiments, components having a critical level of reliability are non-complex electronic hardware components. This includes deterministic (or binary) logic components, such as Boolean gates, non-complex hardware switches, commercial off-the-shelf (COTS) components, and the like. Firmware, which is understood as a specific class of software that provides low-level control for a device's specific hardware, also falls into the category of non-complex electronic hardware components. All components that measure, process, and display the lubricant level when the lubricant level is below the minimum operating level have a critical level of reliability.

In one example embodiment, the system 200 comprises a fluid-level sensor 202 coupled to the lubricating system 110 of the engine 100. For example, the fluid-level sensor may be of a floating mechanism-type inside a fluid tank of the lubricating system 110, and provide an analog or discrete measurement signal using a network of resistive elements and reed switches. Other types of fluid sensors may also be used, such as load cells, magnetic level gauges, capacitance transmitters and other hydrostatic devices. The fluid-level sensor 202 may be any type of fluid sensor that is composed only of non-complex electronic hardware or other components having a critical level of reliability, due to its role in measuring the lubricant level below the minimum operating level.

The measurement signal representative of the fluid level is sent from the fluid sensor 202 to a low-level detector 204 which processes the measured signal from the fluid sensor 202 using components having a critical level of reliability, such as non-complex electronic hardware. The low-level detector 204 may comprise one or more Boolean gates or switches that will trigger a low-level indicator 206 when the lubricant level is below the minimum operating level. The low-level indicator may be a light, such as a Light Emitting Diode (LED) or other simple mechanical or electronic component having a critical level of reliability. The low-level indicator 206 may be part of an aircraft indications system that receives and displays the fluid level, for example in a cockpit of an aircraft. The aircraft indications system may include switches and lights outside of an avionics display. For a non-aerospace application, the low-level indicator 206 may be part of equipment operated by an operator.

The low-level detector 204 is also coupled to an annunciation and display system 208 for performing one or more of the non-critical functions related to the lubricating fluid. All other lubricant-related functions (i.e. other than annunciating a fluid level below a minimum operating level), such as those related to planning the lubricating fluid services where adding fluid is not required or essential for a coming flight, are performed by the annunciation and display system 208. As these functions do not relate to measuring, processing, and displaying the fluid level when the fluid level is below the minimum operating level, the components used for the annunciation and display system 208 can have a non-critical level of reliability.

In some embodiments, the annunciation and display system 208 is configured to detect faults and/or potential dormancies in the components found in section 201, i.e. the components having a critical level of reliability.

Figure 2B:
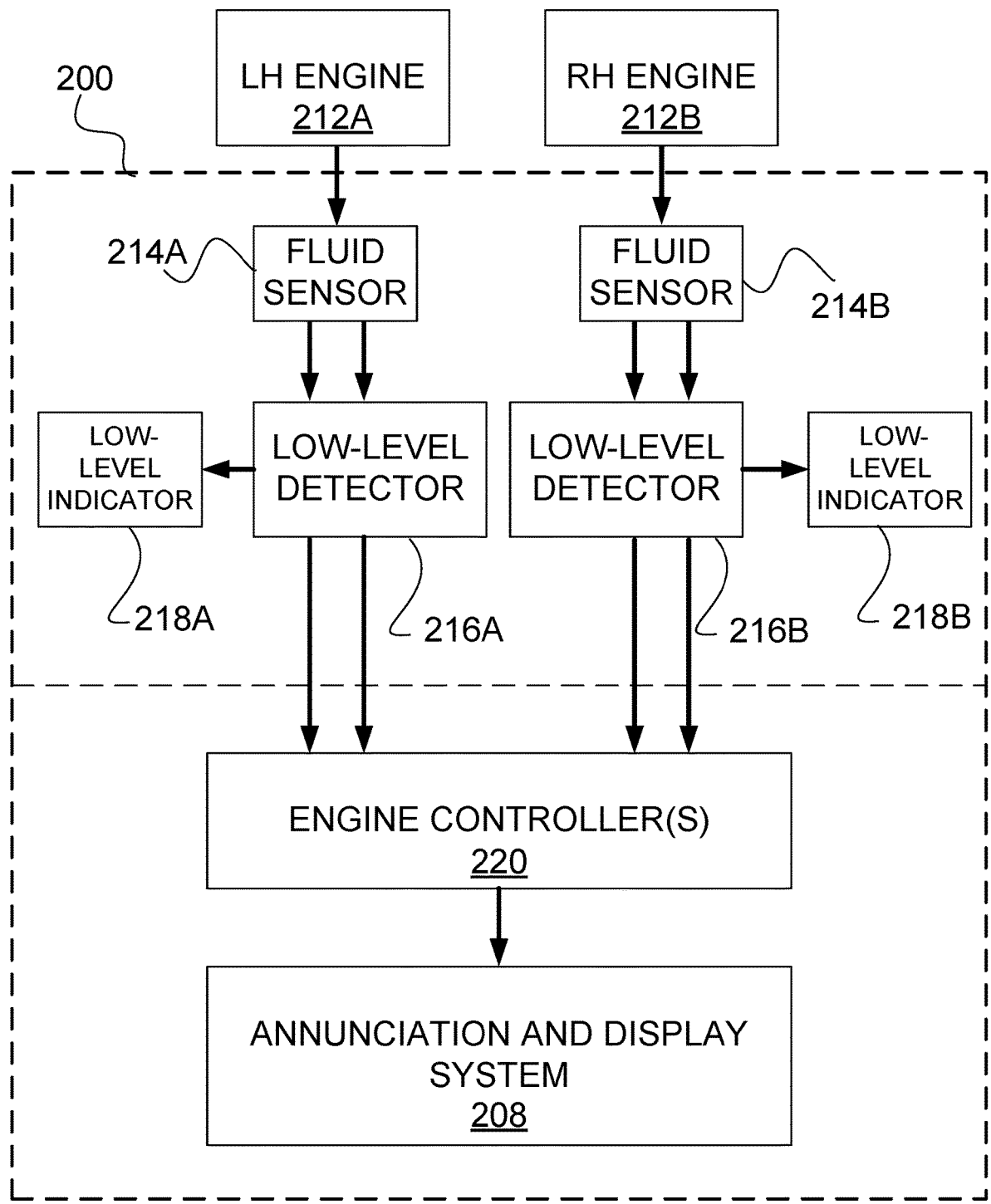
FIG. 2B is a block diagram of an example lubricating fluid level annunciating system for a dual-engine aircraft.

FIG. 2B illustrates an example embodiment of the system 200 as applied to a dual engine aircraft. In this example, a left hand (LH) engine 212A and right hand (RH) engine 212B each have dedicated fluid sensors 214A, 214B, low level detectors 216A, 216B, and low-level indicators 218A, 218B, respectively, all of which have a critical level of reliability. In some embodiments, the fluid sensors 214A, 214B are dual-channel sensors, for added redundancy. Similarly, the low-level detectors 216A, 216B may also be dual-channel. This configuration can achieve higher numerical probability requirements, such as less than $1 \times 10^{-9}$ chances of an inflight shutdown of the engines 212A, 212B.

In some embodiments, the annunciation and display system 208 is shared by the LH engine 212A and RH engine 212B. Alternatively, a separate annunciation and display system 208 may be provided for each engine. While the example of FIG. 2B illustrates two engines, there may be more than two engines.

In some embodiments, the signals coming from the low level detectors 216A, 216B are routed to the annunciation and display system 208 through one or more engine controller 220. The engine controller 220 can be implemented as part of a full-authority digital engine controls (FADEC) or other similar device, including electronic engine control (EEC), engine control unit (ECU), electronic propeller control, propeller control unit, and the like.

The segregation of the critical and non-critical lubricant-related functions as illustrated in FIGS. 2A and 2B allow the annunciation and display system 208 to have software, including complex software and custom micro-coded components. The system 200 may therefore be retrofit to existing avionic platforms having a non-critical level of reliability.

Figure 3:
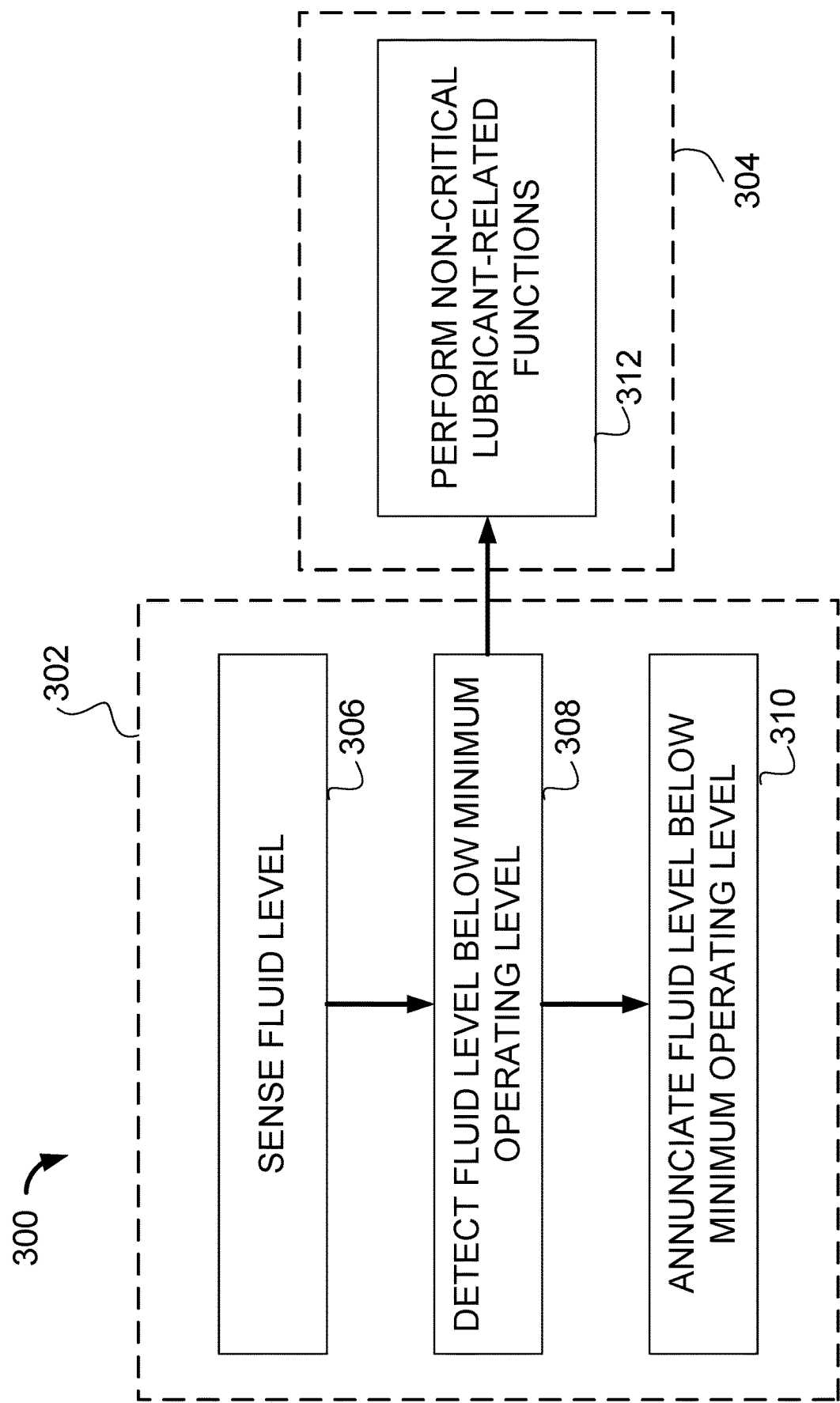
FIG. 3 is a flowchart of an example method for annunciating engine lubricating fluid level.

With reference to FIG. 3, there is illustrated an example method 300 for verifying a level of lubricating fluid of at least one engine. Critical and non-critical lubricant-related functions are segregated, such that critical functions 302 are performed independently from non-critical functions 304. The critical functions 302 comprise sensing the fluid level at step 306, detecting a fluid level below a minimum operating level at step 308, and annunciating the fluid level below the minimum operating level at step 310. The non-critical functions 304 comprise one or more lubricant-related functions at step 312, such as diagnostics, prognostics, and health management excluding annunciating a lubricating fluid level below a minimum operating level.

Figure 4:
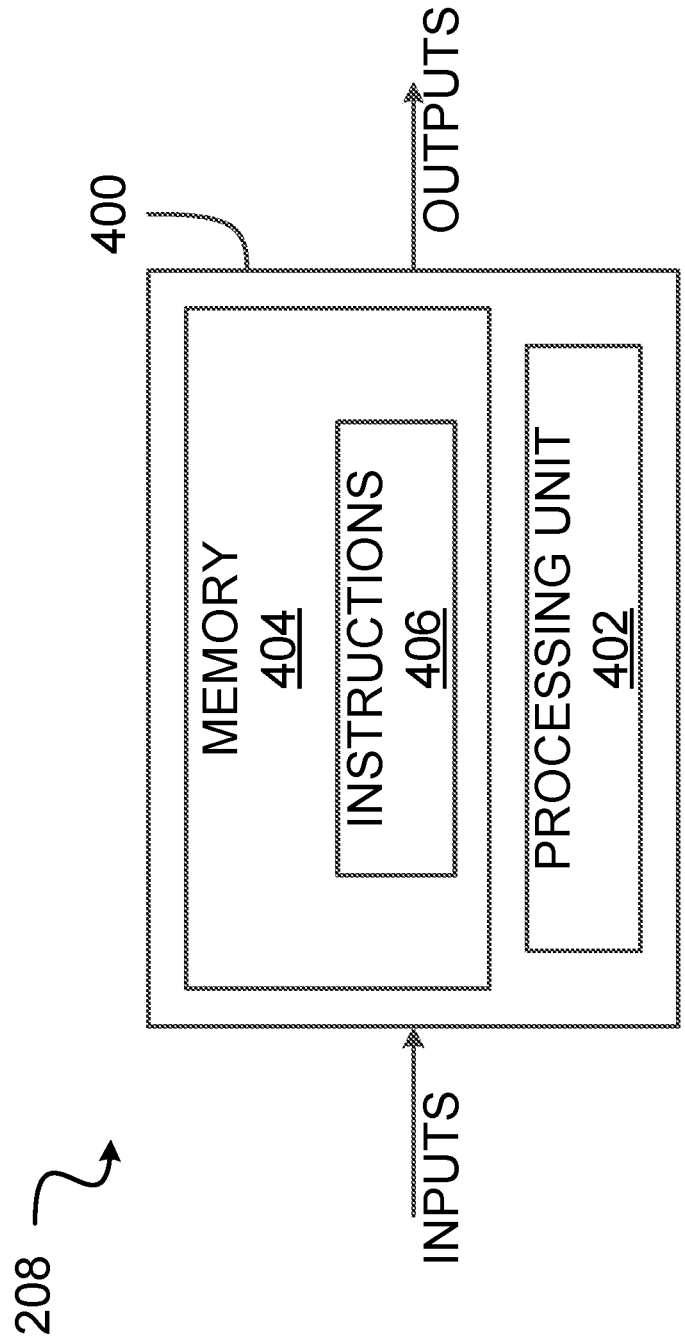
FIG. 4 is a block diagram of an example computing device.

With reference to FIG. 4, an example of a computing device 400 is illustrated, which may be used to form part of all of the annunciation and display system 208 and/or the engine controller 220. For simplicity only one computing device 400 is shown but more computing devices 400 may be operable to exchange data. The computing devices 400 may be the same or different types of devices. The computing device 400 comprises a processing unit 402 and a memory 404 which has stored therein computer-executable instructions 406. The processing unit 402 may comprise any suitable devices configured to implement the non-critical functions 304 such that instructions 406, when executed by the computing device 400 or other programmable apparatus, may cause the functions/acts/steps performed as part of step 312 to be executed. The processing unit 402 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof. In some embodiments, the annunciation and display system 208 is an off-the-shelf component, used in combination with components having a critical level of reliability.

The memory 404 may comprise any suitable known or other machine-readable storage medium. The memory 404 may comprise non-transitory computer readable storage medium, for example, but not limited to, an electronic, magnetic, optical, electromagnetic, infrared, or semiconductor system, apparatus, or device, or any suitable combination of the foregoing. The memory 404 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 404 may comprise any storage means (e.g., devices) suitable for retrievably storing machine-readable instructions 406 executable by processing unit 402.

The non-critical functions 304 described herein may be implemented in a high level procedural or object oriented programming or scripting language, or a combination thereof, to communicate with or assist in the operation of a computer system, for example the computing device 400. Alternatively, the non-critical functions 304 may be implemented in assembly or machine language. The language may be a compiled or interpreted language. Program code for implementing the non-critical functions 304 may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the non-critical functions 304 may also be considered to be implemented by way of a non-transitory computer-readable storage medium having a computer program stored thereon. The computer program may comprise computer-readable instructions which cause a computer, or more specifically the processing unit 402 of the computing device 400, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the annunciation and display system 208 may include components that meet a critical level of reliability and components that do not meet the critical level of reliability, such that the system 208 as a whole has a non-critical level of reliability. Yet further modifications could be implemented by a person of ordinary skill in the art in view of the present disclosure, which modifications would be within the scope of the present technology.

The invention claimed is:

1. An engine lubricating fluid level annunciation system comprising:
a first fluid level sensor for a first engine;
a first low-level detector coupled to the first fluid level sensor;
a first low-level indicator coupled to the first low-level detector for annunciating a fluid level of the first engine below a minimum operating level; and
an annunciation and display system coupled to the first low-level detector and configured for performing non-critical lubricant-related functions;
the first fluid level sensor, the first low-level detector, and the first low-level indicator composed of first components having a critical level of reliability meeting requirements for Design Assurance Level (DAL) A of Design Assurance Guidance for Airborne Electronic Hardware, the annunciation and display system composed of second components having a non-critical level of reliability meeting requirements for DAL B or DAL C.

2. The system of claim 1, wherein the low-level detector is coupled to the annunciation and display system through an engine controller.

3. The system of claim 1, wherein the low-level indicator is part of an aircraft indication system outside of an avionics display.

4. The system of claim 1, wherein the first components having the critical level of reliability are non-complex electronic hardware components.

5. The system of claim 1, wherein the annunciation and display system comprises software.

6. The system of claim 1, wherein the first fluid level sensor and the first low-level indicator are dual-channel.

7. The system of claim 1, further comprising:
a second fluid level sensor for a second engine;
a second low-level detector coupled to the second fluid level sensor; and
a second low-level indicator coupled to the second low-level detector for annunciating a lubricant level of the second engine below the minimum operating level;
the second fluid level sensor, second low-level detector, and second low-level indicator composed of third components having the critical level of reliability.

8. The system of claim 7, wherein the second low-level detector is coupled to the annunciation and display system, and the annunciation and display system performs non-critical lubricant-related functions for the first engine and the second engine.

9. The system of claim 8, wherein the first engine and the second engine are part of a multi-engine aircraft.

10. A method for annunciating a level of lubricating fluid of at least one engine, the method comprising:
segregating critical and non-critical lubricant-related functions, the critical lubricant-related functions comprising measuring, detecting and annunciating a lubricant level of the at least one engine below a minimum operating level;
performing the critical lubricant-related functions with first components having a critical level of reliability meeting requirements for Design Assurance Level (DAL) A of Design Assurance Guidance for Airborne Electronic Hardware; and
performing the non-critical lubricant-related functions with second components having a non-critical level of reliability meeting requirements for DAL B or DAL C.

11. The method of claim 10, wherein performing the non-critical lubricant-related functions comprises using an aircraft annunciation and display system.

12. The method of claim 11, wherein the lubricant level of the at least one engine is provided to the aircraft annunciation and display system through an engine controller.

13. The method of claim 10, wherein the first components are non-complex electronic hardware components.

14. The method of claim 10, wherein the at least one engine comprises a first engine and a second engine, and performing the critical lubricant-related functions comprises performing the critical lubricant related functions for the first engine and the second engine with dedicated ones of the first components having the critical level of reliability.

15. The method of claim 10, wherein annunciating the lubricant level of the at least one engine below a minimum operating level comprises flashing a light.

16. The method of claim 15, wherein the light is in a cockpit of an aircraft.

17. A method for annunciating a level of lubricating fluid of at least one aircraft engine, the method comprising:
sensing a fluid level with a fluid level sensor;
detecting the fluid level below a minimum operating level at a low-level detector;
annunciating the fluid level below the minimum operating level through a low-level indicator; and
performing non-critical lubricant-related functions using an annunciation and display system coupled to the low-level detector;
the fluid level sensor, low-level detector, and low-level indicator composed of first components having a critical level of reliability meeting requirements for Design Assurance Level (DAL) A of Design Assurance Guidance for Airborne Electronic Hardware, the annunciation and display system composed of second components having a non-critical level of reliability meeting requirements for DAL B or DAL C.

18. The method of claim 17, further comprising providing the annunciation and display system with the fluid level through at least one engine controller.

\* \* \* \* \*